(12) United States Patent
Marsetti et al.

(10) Patent No.: US 11,518,618 B2
(45) Date of Patent: Dec. 6, 2022

(54) CONVEYOR BELT WITH ARTICULATED LINKS PROVIDED WITH ROLLING BALLS

(71) Applicant: MOVEX S.P.A., Castelli Calepio (IT)

(72) Inventors: Sergio Marsetti, Paradiso (CH); Matteo Marsetti, Telegate (IT)

(73) Assignee: MOVEX S.P.A., Castelli Calepio (IT)

( * ) Notice: Subject to any disclaimer, the term of this patent is extended or adjusted under 35 U.S.C. 154(b) by 0 days.

(21) Appl. No.: 17/481,617

(22) Filed: Sep. 22, 2021

(65) Prior Publication Data

US 2022/0097975 A1 Mar. 31, 2022

(30) Foreign Application Priority Data

Sep. 30, 2020 (IT) .................... 102020000023095

(51) Int. Cl.
| | | |
|---|---|---|
| *B65G 17/08* | (2006.01) | |
| *B65G 17/24* | (2006.01) | |
| *B65G 17/32* | (2006.01) | |
| *B65G 17/40* | (2006.01) | |
| *B65G 17/34* | (2006.01) | |

(52) U.S. Cl.
CPC ........... *B65G 17/345* (2013.01); *B65G 17/08* (2013.01); *B65G 2207/26* (2013.01); *B65G 2207/34* (2013.01)

(58) Field of Classification Search
None
See application file for complete search history.

(56) References Cited

U.S. PATENT DOCUMENTS

| | | | | |
|---|---|---|---|---|
| 6,148,990 A  * | 11/2000 | Lapeyre | ................ | B65G 17/40 198/779 |
| 6,494,312 B2 * | 12/2002 | Costanzo | ............... | B65G 17/40 198/779 |
| 7,021,454 B2 * | 4/2006 | Ozaki | .................... | B65G 17/32 198/779 |
| 7,364,038 B2 * | 4/2008 | Damkjaer | .............. | B65G 17/32 198/853 |
| 7,419,052 B2 * | 9/2008 | Ozaki | .................... | B65G 17/24 198/852 |

(Continued)

FOREIGN PATENT DOCUMENTS

| | | |
|---|---|---|
| CN | 207497482 U | 6/2018 |
| CN | 110641903 A | 1/2020 |

(Continued)

*Primary Examiner* — Kavel Singh
(74) *Attorney, Agent, or Firm* — Dickinson Wright PLLC; Andrew D. Dorisio (57) ABSTRACT

A conveyor belt includes a plurality of modules arranged in succession and articulated with each other. First and second projections of the modules have mating profiles to allow the insertion of a connecting pin between adjacent modules. Each module includes housings for respective rolling balls projecting through a respective circular opening. The ratio between the diameter of at least one circumferential portion of the housing and the diameter of the respective rolling ball is between 0.8 and 0.6, while at least part of a rib is provided below, near the lower surface, with at least one respective projecting portion arranged for snap-fit insertion of the rolling ball into the respective housing seat.

11 Claims, 5 Drawing Sheets

(56) References Cited

U.S. PATENT DOCUMENTS

| | | | | |
|---|---|---|---|---|
| 7,527,143 B2 * | 5/2009 | Krisl | ...................... | B65G 17/24 |
| | | | | 198/779 |
| 7,891,481 B2 * | 2/2011 | Pressler | ................. | B65G 17/24 |
| | | | | 198/779 |
| 7,997,404 B2 * | 8/2011 | Krisl | ...................... | B65G 17/40 |
| | | | | 198/779 |
| 8,783,449 B2 * | 7/2014 | Murakami | ............. | B65G 15/30 |
| | | | | 198/779 |
| 8,881,890 B2 * | 11/2014 | MacLachlan | .......... | B65G 17/40 |
| | | | | 198/779 |
| 9,555,972 B2 * | 1/2017 | Ishikawa | ................ | B65G 17/40 |
| 10,773,896 B1 * | 9/2020 | Smith | .................... | B65G 17/24 |

FOREIGN PATENT DOCUMENTS

| | | |
|---|---|---|
| JP | 2012030914 A | 2/2012 |
| JP | 2013006654 A | 1/2013 |

* cited by examiner

CONVEYOR BELT WITH ARTICULATED LINKS PROVIDED WITH ROLLING BALLS

This application claims priority to Italian Patent Application No. 102020000023095 filed on Sep. 30, 2020, the disclosure of which is incorporated herein by reference.

TECHNICAL FIELD

The present invention generally relates to conveyors of bulk objects provided with conveyor belts and, in particular, a conveyor belt with articulated links provided with rolling balls.

BACKGROUND

As is known, a bulk object conveyor defines a moving surface for generic objects to be transported. Such a conveyor is generally provided with one or more movable and flexible conveyor belts. Each conveyor belt can in turn consist of a plurality of modular elements, also called "links", which are connected together to form a closed loop. This closed loop conveyor belt is designed to at least partially slide on a support structure which defines a straight or curved feeding direction of the moving surface.

The conveyor belt modular elements are mutually joined by means of an articulation system with rotoidal joints. Projections (the so-called "hinge rings") which interpenetrate and are held together by an articulation pin of each rotoidal joint are in fact provided at the opposite sides of each pair of contiguous modular elements. This articulation pin passes through a series of holes, made in the projections of the modular elements, which extend along a direction transverse and substantially perpendicular to the conveyor belt longitudinal moving direction.

Each modular element of the conveyor belt is provided with an upper surface, or transporting surface, on which the objects to be transported can be positioned. A plurality of rolling balls can project from this transporting surface, which are usually mounted idly inside respective housing seats obtained on each modular element. The objects to be transported actually lay on these rolling balls. The presence of the rolling balls on each modular element therefore allows the conveyor belt to more effectively move, deviate and/or direct the objects of different size and weight.

Examples of conveyor belts with modular elements provided with rolling balls are described, for example, in documents U.S. Pat. No. 6,148,990, WO 2004/078617 and EP 1591383, as well as in documents CN-A-110641903 and CN-U-207497482. Documents U.S. Pat. Nos. 3,679,043 and 5,238,099, instead, describe conveyor belts which are provided with rolling balls but which are continuous, that is they do not consist of mutually hinged modular elements.

Usually, conveyor belts with modular elements which are equipped with rolling balls are entirely made of plastic, so as to be easily washable, and are widely used both in the food industry, for transporting packaged and/or non-packaged edible products, and in the logistics, for transporting products usually packaged in corrugated cardboard boxes, and in distribution centres. However, a drawback of these conveyor belts with modular elements provided with rolling balls is due to the fact that food liquids, paper and cardboard residues from packaging and dirt can enter the interstices between the rolling balls and the respective housing seats during transportation of the products. These waste materials can impair the free rolling of the balls, up to the point of locking them within their respective housing seats.

Another drawback of these conveyor belts with modular elements provided with rolling balls is due to their lower structural resistance, in terms of both tensile strength and transversal flexibility, compared to similar conveyor belts with modular elements without rolling balls. If there are no rolling balls and, above all, the respective housing seats, each modular element is in fact usually manufactured starting from a solid, that is internally full plastic block. The presence of the housing seats, in the modular elements of the conveyor belts provided with rolling balls of known type, therefore weakens their respective structure, since these housing seats are obtained by removing part of the plastic material each modular element consists of.

SUMMARY

The object of the present invention is therefore to provide a conveyor belt with articulated links, provided in particular with rolling balls, which is capable of solving the aforementioned drawbacks of the prior art in an extremely simple, economical and particularly functional way.

In detail, it is an object of the present invention to provide a conveyor belt with articulated links that allows to avoid, or at least minimize, the locking of the rolling balls caused by any dirt and various residues that could enter between these rolling balls and their respective housing seats.

Another object of the present invention is to provide a conveyor belt with articulated links provided with rolling balls which is particularly sturdy and resistant compared to similar conveyor belts provided with rolling balls according to the prior art.

These objects according to the present invention will be achieved by providing a conveyor belt with articulated links, in particular provided with rolling balls.

BRIEF DESCRIPTION OF THE DRAWINGS

Further characteristics of the invention are highlighted by the dependent claims, which are an integral part of the present description.

The characteristics and advantages of a conveyor belt with articulated links according to the present invention will be clearer from the following exemplifying and hence non-limiting description, referring to the attached schematic drawings in which.

DETAILED DESCRIPTION

With reference to the figures, a preferred embodiment of the conveyor belt with articulated links according to the present invention is shown. The conveyor belt with articulated links is indicated as a whole with reference number 10.

The conveyor belt 10 is designed to be used in a generic conveyor line to transport various objects, for example food products and/or cardboard packaging, along a predefined feeding direction A. The conveyor belt 10 comprises a plurality of modular elements or links 12A, 12B, 12C, arranged in succession and articulated with each other, and at least one connecting pin 30, which forms part of the articulation system of the conveyor belt 10.

Each modular element 12A, 12B, 12C comprises a respective intermediate portion 14 which extends along a transverse axis B which is substantially perpendicular to the feeding direction A of the conveyor belt 10. Each intermediate portion 14 is provided with both an upper surface 16 on which the objects to be transported are positioned, and a lower surface 44, which is opposite to the upper surface 16. Each modular element 12A, 12B, 12C also comprises a front side 18, a rear side 20, a first lateral side 22 and a second lateral side 24.

A first plurality of projections 26, or connecting ends or hinge rings, which extend along the feeding direction A of the conveyor belt 10 is provided on the front side 18 of each intermediate portion 14. In the embodiment shown in the figures, the first projections 26 define respective upper surfaces which are substantially coplanar with respect to the upper surface 16 of the intermediate portion 14 of each modular element 12A, 12B, 12C.

The first plurality of projections 26 is provided with a first plurality of respective through holes 28. These first through holes 28 are aligned along a single axis C1 which is substantially parallel to the transverse axis B and which is therefore substantially perpendicular to the feeding direction A of the conveyor belt 10. These first through holes 28 are configured for the insertion of a connecting pin 30. A second plurality of projections 32, or connecting ends or hinge rings is provided on the rear side 20 of each intermediate portion 14, which extend along the feeding direction A of the conveyor belt 10 but with the opposite direction with respect to the first plurality of projections 26. In the embodiment shown in the figures, the second projections 32 also define respective upper surfaces which are substantially coplanar both with respect to the upper surface 16 of the intermediate portion 14 of each modular element 12A, 12B, 12C, and with respect to the upper surfaces defined by the first projections 26.

The second plurality of projections 32 is also provided with a second plurality of respective through holes 34. These second through holes 34 are aligned along a single axis C2 which is substantially parallel to the transverse axis B and is therefore substantially perpendicular to the feeding direction A of the conveyor belt 10. These second through holes 34 are also configured for the insertion of the connecting pin 30.

The first plurality of projections 26 and the second plurality of projections 32 have mating profiles, so that the first projections 26 of a first modular element 12A can be interpenetrated with the second projections 32 of an adjacent modular element 12B. Consequently, the first through holes 28 of the first modular element 12A are arranged along the same axis C2 of the second through holes 34 of the adjacent modular element 12B, so as to allow a connecting pin 30 to be inserted to form the rotoidal joint between these two modular elements 12A and 12B.

Each modular element 12A, 12B, 12C is of the type comprising at least one rolling ball 38 and at least one housing seat 36 for a respective rolling ball 38. Each housing seat 36 of the rolling ball 38 is obtained on the intermediate portion 14 of a respective modular element 12A and is provided with at least one respective circular opening 40 placed at the upper surface 16 of this modular element 12A. Each rolling ball 38 is mounted idly inside the respective housing seat 36 and is therefore arranged to project at least partially through the respective circular opening 40, so that the objects positioned on the conveyor belt 10 can lay on the various rolling balls 38 and make them roll freely while moving the objects themselves.

In order to avoid, or at least minimize, the locking of the rolling balls 38 caused by any dirt and various residues that could enter between each rolling ball 38 and the respective housing seat 36, the clearance or gap between each rolling ball 38 and its respective circular opening 40, from which external elements can filter, is reduced to a minimum, without however limiting the smoothness of said rolling ball 38 within the respective housing seat 36, The ratio between the diameter D1 of at least one circumferential portion 42 of each housing seat 36 and the diameter D2 of the respective rolling ball 38 has been therefore suitably calculated in order to be between 0.8 and 0.6, preferably between 0.79 and 0.7.

Figure 7:
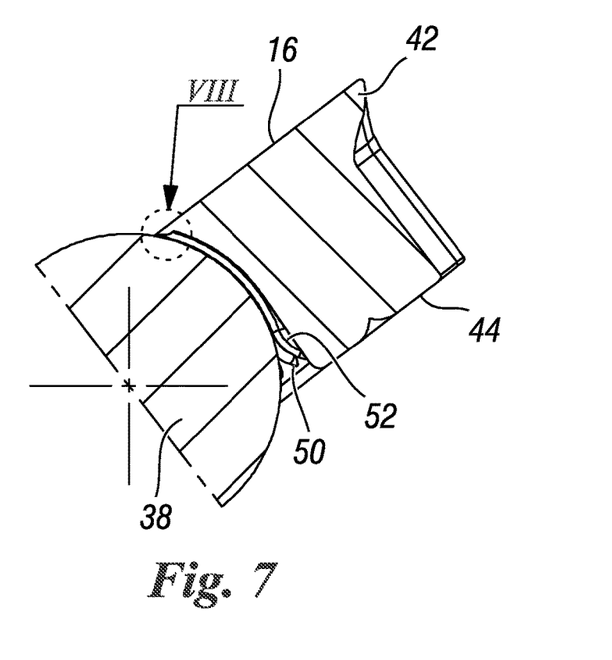
FIG. 7 is an enlarged sectional view obtained along line VII of FIG. 6.
Figure 8:
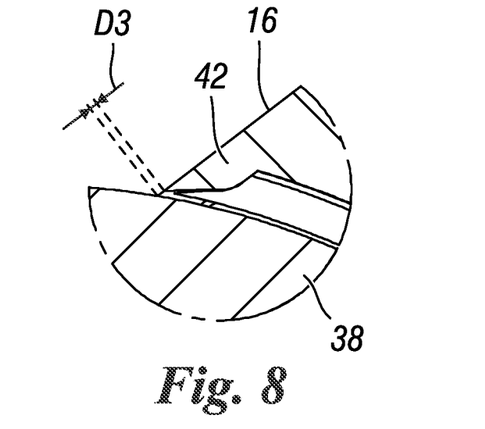
FIG. 8 is a greatly enlarged view of the detail indicated with VIII in FIG. 7.
Figure 10:
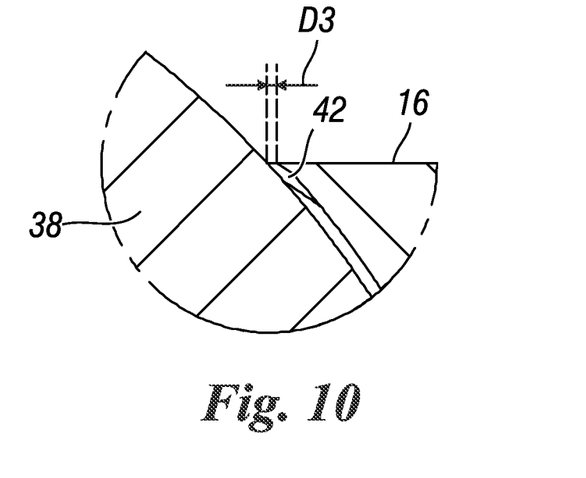
FIG. 10 is a greatly enlarged view of the detail indicated by X in FIG. 7.

In detail, the aforementioned circumferential portion 42 of each housing seat 36 consists of an edge 42 which is placed at the respective circular opening 40 and which is coplanar with respect to the upper surface 16 of the intermediate portion 14 of each modular element 12A, 12B, 12C, but projecting towards the respective rolling ball 38 (see in particular the enlarged views of FIGS. 7, 8 and 10).

Preferably, each edge 42 has a cross-sectional wedge shape, that is a section obtained along a plane perpendicular to the upper surface 16 of the intermediate portion 14 of each modular element 12A, 12B, 12C. The pointed end of this wedge therefore faces the respective rolling ball 38, as shown for example in FIG. 8.

In the exemplifying but non-limiting embodiment of the conveyor belt 10 shown in the attached figures, the diameter D1 of the edge 42, measured at the respective pointed end, is between about 9.4 mm and 9.5 mm. The diameter D2 of each rolling ball 38 is instead equal to about 12.7 mm. Preferably, therefore, the average distance D3 between the pointed end of the wedge which forms the edge 42 and the respective rolling ball 38, which forms the aforementioned clearance or gap between each rolling ball 38 and the respective circular opening 40, is kept within very limited values. This average distance D3 is in fact between 0.1 mm and 0.05 mm and is preferably equal to about 0.07 mm.

Figure 9:
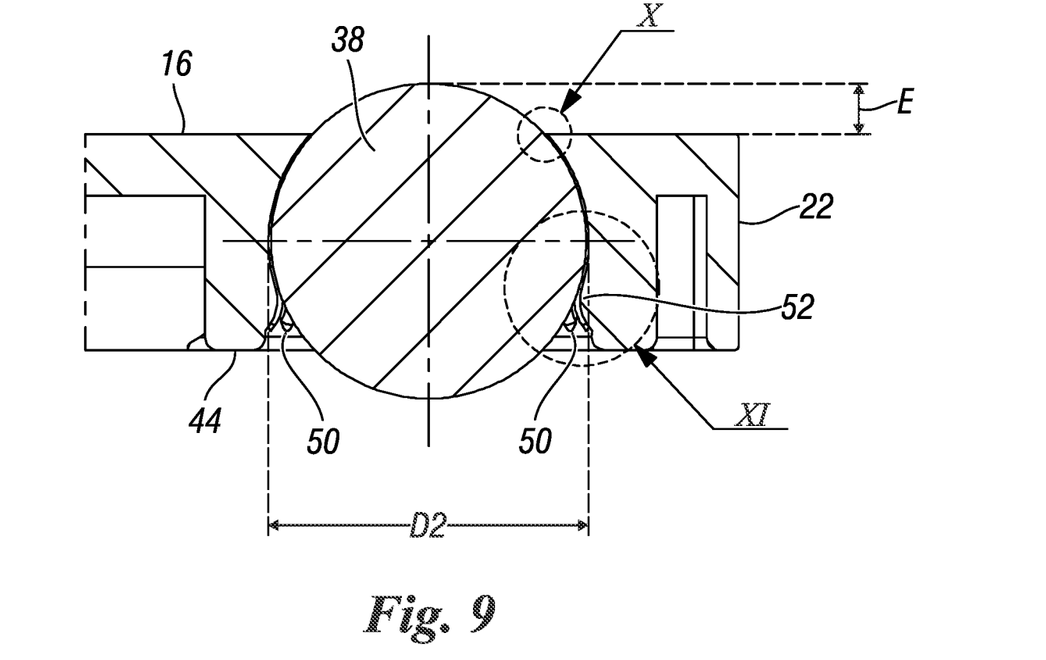
FIG. 9 is an enlarged sectional view obtained along line IX of FIG. 6.

Considering the embodiment of the just described conveyor belt 10, the vertical oscillation ratio of each rolling ball 38, that is the ratio between:

the nominal projection E (FIG. 9) of each rolling ball 38 from the upper surface 16 of the intermediate portion 14 of each modular element 12A, 12B, 12C, and the maximum vertical excursion of this rolling ball 38, that is the maximum excursion along a respective direction substantially perpendicular with respect to the aforementioned upper surface 16, is between 3 and 4 and is preferably equal to about $3.\overline{3}$.

In fact, considering a rolling ball 38 whose diameter D2 is approximately 12.7 mm and a nominal projection E equal to approximately 2 mm, the maximum vertical excursion of this rolling ball 38, in absolute terms, is equal about 0.1 mm upwards (that s towards the upper surface 16 of the intermediate portion 14 of each modular element 12A, 12B, 12C) and about 0.5 mm downwards (that is towards the lower surface 44 of the intermediate portion 14 of each modular element 12A, 12B, 12C).

On the basis of these values, the clearance or gap between each rolling ball 38 and the respective circular opening 40 can be to indirectly defined. On the basis of these values, it is also possible to define:

the ratio between the nominal projection E (2 mm) and the minimum projection (1.5 mm, due to the maximum vertical excursion downwards) of each rolling ball 38, equal to:

$$\frac{2}{1.5} = 1.33$$

and the ratio between the nominal projection E (2 mm) and maximum projection (2.1 mm, due to the maximum vertical excursion upwards) of each rolling ball 38, equal to:

$$\frac{2}{2.1} = 0.95$$

Figure 1:
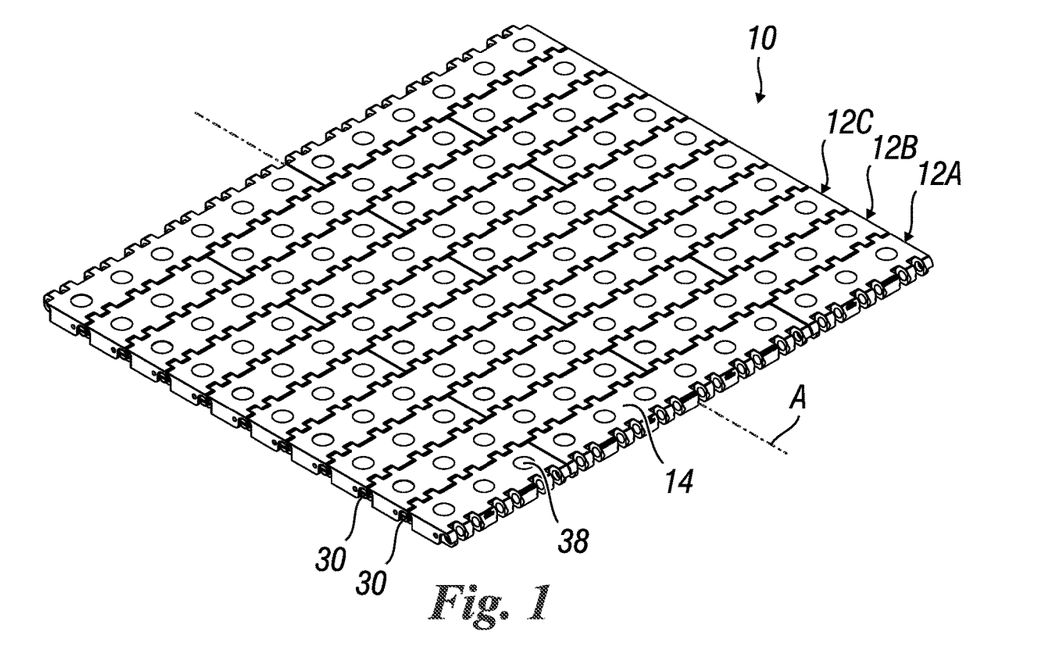
FIG. 1 is a top perspective view of some modular elements or links of a conveyor belt with articulated links according to the present invention.
Figure 2:
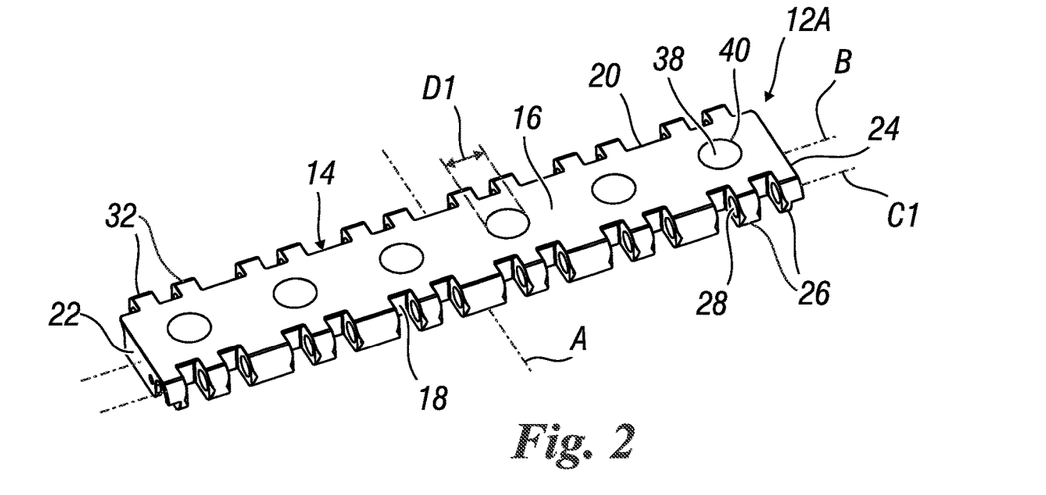
FIG. 2 is a top perspective view of one of the modular elements or links of FIG. 1.
Figure 3:
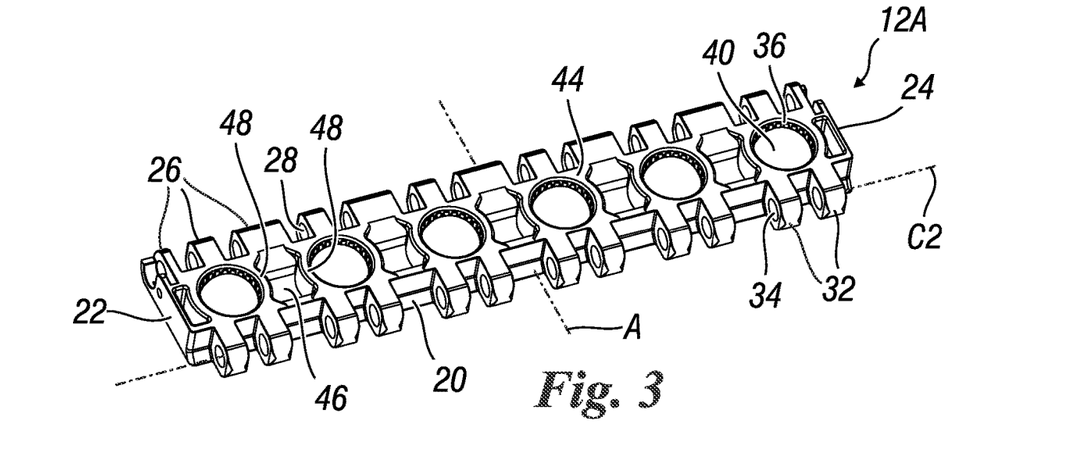
FIG. 3 is a bottom perspective view of the modular element or link of FIG. 2.
Figure 4:
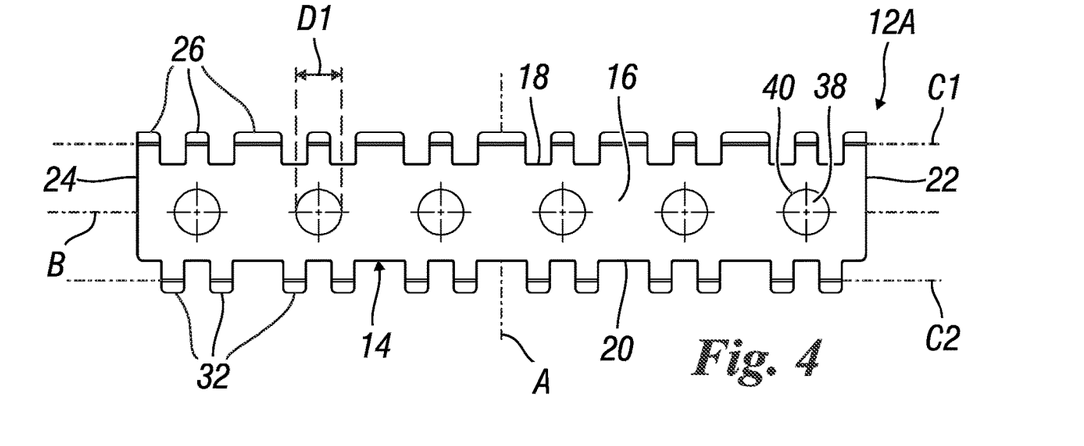
FIG. 4 is a top plan view of the modular element or link of FIG. 2.
Figure 5:
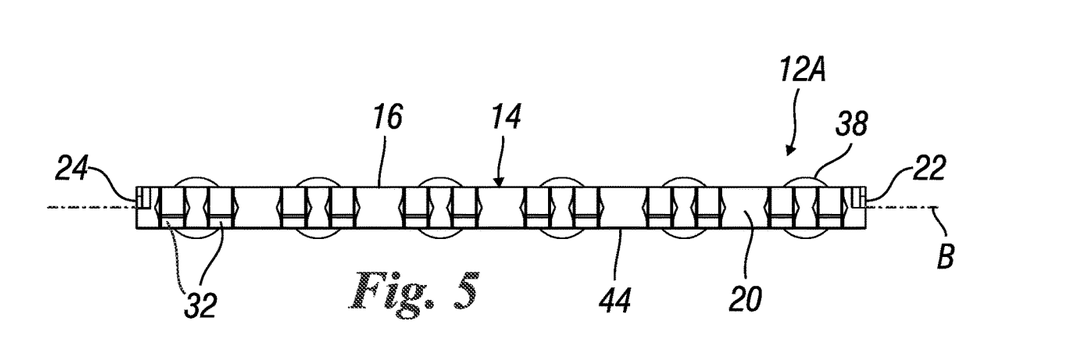
FIG. 5 is a front view of the modular element or link of FIG. 2.
Figure 6:
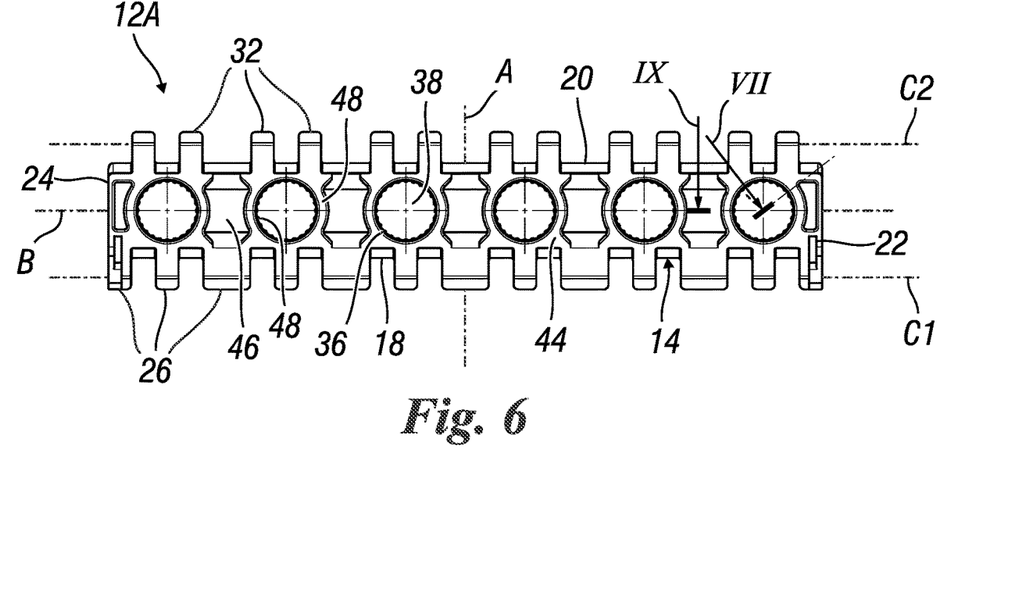
FIG. 6 is a bottom plan view of the modular element or link of FIG. 2.

One or more cavities 46 are formed on the lower surface 44 of the intermediate portion 14 of each modular element 12A, 12B, 12C, for lightening the respective modular element 12A, 12B, 12C, as shown for example in FIGS. 3 and 6. In particular, each of these cavities 46 is obtained between pairs of contiguous housing seats 36.

At least one reinforcing rib 48 is formed between each cavity 46 and each adjacent housing seat 36. Conveniently, each reinforcing rib 48 extends along the feed direction A of the conveyor belt 10 and also forms an extension of at least one of one corresponding first projection 26 and/or one corresponding second projection 32. The structural continuity, along the feeding direction A of the conveyor belt 10, between the reinforcing ribs 48 and the first projections 26 and/or the second projections 32 allows to increase the structural resistance of each modular element 12A, 12B, 12C even in presence of the housing seats 36 for the rolling balls and the lightening cavities 46.

With reference to the housing seats 36, each of them is internally provided with a plurality of ribs 50 which extend along respective directions which are substantially perpendicular to said upper surface 16. These ribs 50 have the function of reducing the contact surface between each rolling ball 38 and the respective housing seat 36, thus improving the smoothness of said rolling ball 38.

At least part of said ribs 50 can be provided at the bottom, near said lower surface 44 of the intermediate portion 14 of each modular element 12A, 12B, 12C, with at least one respective projecting portion 52 arranged to allow each rolling ball 38 to be snap-fit inserted into the respective housing seat 36. The rolling balls 38, as well as the modular elements 12A, 12B, 12C, are in fact preferably made of polymeric materials with sufficient elasticity to allow each rolling ball 38 to be snap-fit inserted into the respective housing seat 36.

Figure 11:
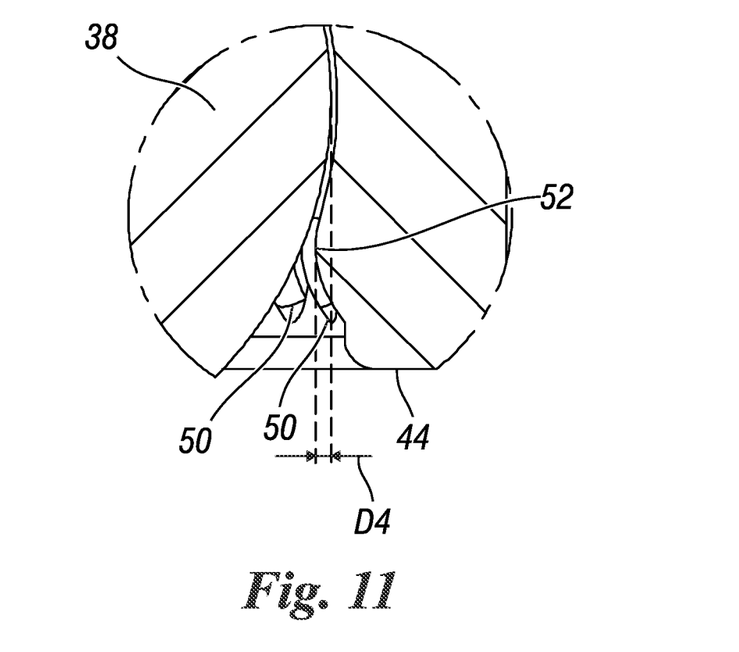
FIG. 11 is an enlarged view of the detail indicated with XI in FIG. 7.

In the exemplifying but non-limiting embodiment of the conveyor belt 10 shown in the attached figures, whose diameter D2 of each rolling ball 38 is equal to about 12.7 mm, the ratio between said diameter D2 of each rolling ball 38 and the thickness D4 (FIG. 11) of each projecting portion 52, intended as an additional thickness with respect to the corresponding rib 50, is between 20 and 30 and is preferably equal to about 25. The thickness D4 of each projecting portion 52 is in fact preferably equal to 0.25 mm. This thickness D4 therefore defines the nominal interference of each rolling ball 38 for snap-fit insertion into the respective housing seat 36.

It has thus been shown that the conveyor belt with articulated links according to the present invention achieves the objects highlighted above. The conveyor belt with articulated links of the present invention thus conceived is however susceptible of numerous modifications and variations, all of which falling within the scope of the same inventive concept; furthermore, all the details can be replaced by technically equivalent elements. In practice, the materials used, as well as the shapes and dimensions, may be any according to the technical requirements.

The scope of protection of the invention is therefore defined by the attached claims.

The invention claimed is:

1. A conveyor belt (10) movable along a predetermined feeding direction (A) in a conveying line, the conveyor belt (10) comprising:
   a plurality of modular elements (12A, 12B, 12C) arranged in sequence and articulated with one another; and
   at least one connecting pin (30), forming part of the articulation system of the conveyor belt (10),
wherein each modular element (12A, 12B, 12C) comprises in turn:
   a respective intermediate portion (14), which develops along a transverse axis (B) substantially perpendicular to said feeding direction (A) and which is provided with both an upper surface (16) on which the objects to be transported are positioned, and a lower surface (44), which is opposite to said upper surface (16);
   a front side (18), a rear side (20), a first lateral side (22) and a second lateral side (24) of each intermediate portion (14);
   a first plurality of projections (26), extending along said feeding direction (A) on the front side (18) of each intermediate portion (14) and which are provided with a first plurality of respective through holes (28) aligned along a single axis (01) substantially parallel to said transverse axis (B);
   a second plurality of projections (32), which extend along said feeding direction (A), but with opposite direction with respect to the first plurality of projections (26), on the rear side (20) of each intermediate portion (14) and which are provided with a second plurality of respective through holes (34) aligned along a single axis (C2) substantially parallel to the transverse axis (B), wherein the first plurality of projections (26) and the second plurality of projections (32) have mating profiles, so that the first projections (26) of a first modular element (12A) can be interpenetrated with the second projections (32) of an adjacent modular element (12B) and the first through holes (28) of the first modular element (12A) are arranged along the same axis (C2) of the second through holes (34) of the adjacent modular element (12B), so as to allow the insertion of a connecting pin (30) to form the rotoidal joint between said two modular elements (12A, 12B);
   at least one rolling ball (38); and
   at least one housing seat (36) for a respective rolling ball (38), said housing seat (36) being obtained on said intermediate portion (14) and being provided with at least one respective circular opening (40) placed at said upper surface (16), wherein each rolling ball (38) projects at least partially through the respective circular opening (40),
wherein each housing seat (36) is internally provided with a plurality of ribs (50) which extend along respective directions which are substantially perpendicular to said upper surface (16), the conveyor belt (10) being characterized in that a ratio between a diameter (D1) of at least one circumferential portion (42) of said housing seat (36) and a diameter (D2) of said rolling ball (38) is comprised between 0.8 and 0.6, preferably between 0.79 and 0.7, and in that at least part of said ribs (50) is provided at a bottom, near said lower surface (44), with at least one respective projecting portion (52) arranged to allow each rolling ball (38) to be snap-fit inserted into the respective housing seat (36).

2. The conveyor belt (10) according to claim 1, characterized in that the ratio between the diameter (D1) of at least one circumferential portion (42) of said housing seat (36) and the diameter (D2) of said rolling ball (38) is between 0.79 and 0.7.

3. The conveyor belt (10) according to claim 1, characterized in that said circumferential portion (42) of said housing seat (36) consists of an edge (42) which is placed at said circular opening (40) and which is coplanar with respect to said upper surface (16), but projecting towards the respective rolling ball (38).

4. The conveyor belt (10) according to claim 3, characterized in that each edge (42) has a cross-sectional wedge shape, that is a section obtained along a plane perpendicular to said upper surface (16), wherein the pointed end of said wedge faces the respective rolling ball (38).

5. The conveyor belt (10) according to claim 4, characterized in that an average distance (D3) between the pointed end of said wedge and the respective rolling ball (38) is between 0.1 mm and 0.05 mm.

6. The conveyor belt (10) according to claim 5, characterized in that the average distance (D3) between the pointed end of said wedge and the respective rolling ball (38) is equal to about 0.07 mm.

7. The conveyor belt (10) according to claim 1, characterized in that one or more cavities (46) are formed on said lower surface (44) for lightening said modular elements (12A, 12B, 12C), each cavity (46) being obtained between pairs of contiguous housing seats (36).

8. The conveyor belt (10) according to claim 7, characterized in that at least one reinforcing rib (48) is formed between each cavity (46) and each adjacent housing seat (36).

9. The conveyor belt (10) according to claim 8, characterized in that each reinforcing rib (48) extends along said feed direction (A) and forms an extension of at least one of said first plurality of projections (26) and/or said second plurality of projections (32).

10. The conveyor belt (10) according to claim 1, characterized in that the ratio between the diameter (D2) of said rolling ball (38) and a thickness (D4) of each projecting portion (52) is between 20 and 30.

11. The conveyor belt (10) according to claim 10, characterized in that the ratio between the diameter (D2) of said rolling ball (38) and the thickness (D4) of each projecting portion (52) is about 25.

* * * * *